United States Patent [19]

O'Neill

[11] Patent Number: 5,691,843
[45] Date of Patent: Nov. 25, 1997

[54] ENHANCED DEPTH PERCEPTION IN A TWO-DIMENSIONAL IMAGE

[76] Inventor: William J. O'Neill, 2901 E. Eisenhower Pkwy., Ann Arbor, Mich. 48108

[21] Appl. No.: 511,091

[22] Filed: Aug. 3, 1995

Related U.S. Application Data

[63] Continuation-in-part of Ser. No. 164,507, Dec. 9, 1993, abandoned.

[51] Int. Cl.$^6$ .................. G02B 27/22; G02B 27/26
[52] U.S. Cl. .................. 359/464; 359/465; 359/477; 359/462
[58] Field of Search .................. 359/462, 464, 359/465, 466, 477; 348/58, 60

[56] References Cited

U.S. PATENT DOCUMENTS 3,597,042 8/1971 Favre .................. 350/144

FOREIGN PATENT DOCUMENTS 3421513 1/1986 Germany .................. 359/465

Primary Examiner—Paul M. Dzierzynski
Assistant Examiner—Audrey Chang
Attorney, Agent, or Firm—Gifford,Krass,Groh,Sprinkle,Patmore,Anderson&Citkowski

[57] ABSTRACT

Light filtering materials, preferably vertical strips of polarizing material, are disposed proximate to a suitably framed two-dimensional image to induce a sense of depth perception. In one embodiment, the image includes a frame disposed around its perimeter, and vertical strips of a polarizing material having a first axis of polarization are placed along the rightmost edge of the image and the leftmost outer edge of the frame, and vertical strips of a polarizing material having a second axis of polarization are disposed along the left edge of the image and along the right outermost edge of the frame. A complementary set of these materials is also supported in eyeglass frames, whereby the right eye sees the left edge of the image but not the right edge of the image or the right outermost strip, and the left eye sees the right edge of the image but not the left edge of the image or appear to recede from the plane of the frame and the frame to come forward relative to the image, thus imparting a dramatic window-like effect. The addition of shadowmasks, which truncate at least a portion of the image may also be used in conjunction with the light filtering materials to further enhance the sense of depth perception.

20 Claims, 10 Drawing Sheets

FIG. 7
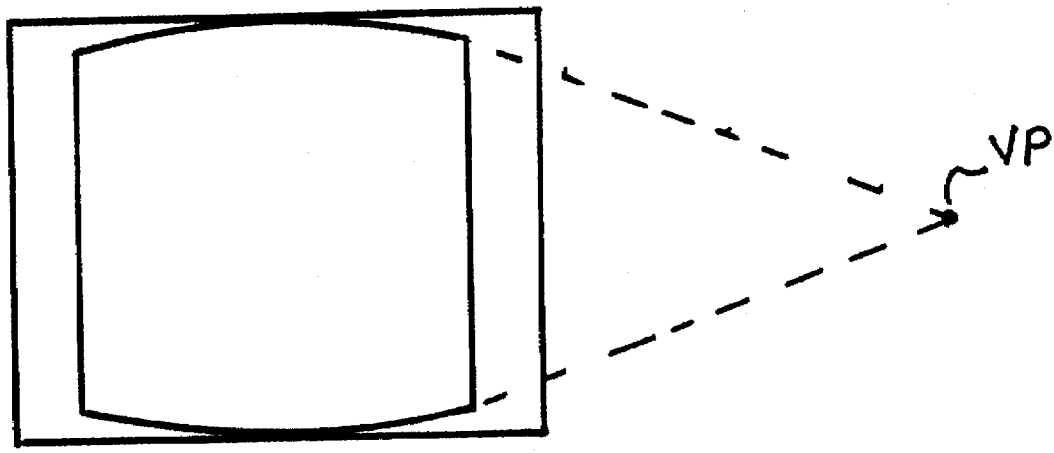
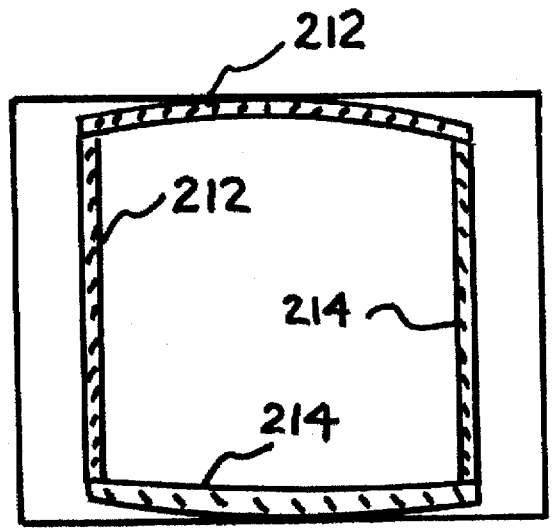
FIG. 8

ENHANCED DEPTH PERCEPTION IN A TWO-DIMENSIONAL IMAGE

REFERENCE TO RELATED APPLICATIONS

This is a continuation-in-part of Ser. No. 08/164,507, filed Dec. 9, 1993 now abandoned.

FIELD OF THE INVENTION

The present invention relates generally to depth enhancement of a two-dimensional image, and, in particular, to the use of optical filtering which causes a two-dimensional image and the area framing the image to appear to reside along different spatial planes relative to an observer.

BACKGROUND OF THE INVENTION

Although human beings naturally perceive three dimensions through stereoscopic vision, most electronically and optically formed images are two-dimensional in nature. Commercial television, and photographic prints and slides are, for instance, 2-D. Many advantages are to be gained from techniques for perceiving three dimensions from a two-dimensional screen, however, including the enhanced understanding of technical displays, and the increased enjoyment of programming intended for entertainment purposes.

Various techniques are understood and available to provide true three-dimensional viewing of a two-dimensional image or on a 2-D display screen. A straightforward approach is to record the image to be viewed through two lenses, and provide the viewer with glasses with filters which selectively present only one perspective to each eye, thereby recreating depth perception in accordance with the vantage points used for the original recording. Electronically synchronized liquid-crystal shutters are often used in the viewing glasses associated with true stereoscopically recorded video images. Other genuine three-dimensional viewing techniques are also possible for use with still images, including photographs.

In order to perceive true three-dimensionality, however, stereoscopic optical recording must be employed. As such, a duplication of equipment, including separate optics, recording and viewing means must necessarily be provided in order to accommodate faithful reproduction of the different perspectives delivered to the two eyes of the viewer. This complication results in a more sophisticated system overall, involving alignment, staging and so forth and, in the case of true 3-D TV, more complex synchronization and increased bandwidth requirements. To implement such TV systems on a large scale basis would further require fundamental changes to the infastructure now used for television broadcasting, including alterations to the media now used for video and/or film recording.

The added cost and complexity of true 3-D imaging has led to the desire to develop illusionary or pseudo-stereoscopic techniques and systems which, broadly speaking, manipulate a monocular or two-dimensional image in such a way that an illusion of three-dimensionality is perceived by the viewer. These systems represent a compromise between providing all of the necessary hardware and control required for true 3-D, but require the viewer to synthesize three dimensions, when, in fact, only two-dimensional information is provided.

The three major factors which contribute to the perception of depth are parallax, perspective and Parallax results from the separation between the two eyes. Each eye produces a slightly different perspective when viewing the same scene. This is the essential component in the formation of true three dimensional images.

Perspective or linear perspective is contained within every image and is characterized by the representation of three-dimensional objects and depth relationships on a two-dimensional surface.

Periphery differences are observed as left edge elements of a scene which are present in the left eye view but not present in the right eye view and right edge elements of a scene which are present in the right eye view but not present in the left eye view. These differences are produced by the separation between the two eyes.

When parallax is absent, as in the case when dealing with all two-dimensional images, it is necessary to operate upon the remaining two factors in order to create a sensation of three dimensionality in a two-dimensional image. The more one exploits the effects of perspective and/or periphery the more apparent depth is imparted to the scene.

The impact of parallax upon three-dimensional perception diminishes rapidly with distance. When objects lie at a distance such that the separation between the two eyes is less than approximately one percent of the viewing distance parallax contributions are virtually non-existent. Perspective and periphery influences become the dominant variables. The mind has learned through lifelong long distance viewing experiences to ignore the absence of parallax and to use perspective and periphery factors to locate objects in space.

With true three-dimensional perception, the separation of the eyes of the viewer introduces parallax into the observed scene. Part of the parallax contribution results in an offset of one image relative to the other such that an object at the center of the scene will be displaced to the right of the center for the left eye and to the left of the center for the right eye. Various degrees of horizontal offset will occur at various distances such that closer objects will be more offset than objects which are further away.

In contrast, a two-dimensional image does not contain offset information as described above. An artificial offset may, however, be introduced by simultaneously presenting an identical image in two slightly different horizontal positions to both eyes. Such a technique, if properly applied, causes the eye muscles to converge at a plane in space which is different from the true plane of projection, resulting in an image which suggests that the observer is seeing a three-dimensional scene.

To create such a pseudo-stereoscopic image electronic means may be employed. For example, in my co-pending application Ser. No. 07/873,400. I describe an electronic module which is operatively connected between an incoming signal source and a display device, the module performing horizontal delay and scan adjustments to alternating fields of the television image. Vertical size and luminance may be modified as well to further enhance the perception of three-dimensionality. A pair of liquid-crystal glasses operatively communicate with the module to force each eye to perceive only one of the two alternating fields. Passive optical means may also be used to create a pseudo-stereoscopic image, as described in my co-pending application, Ser. No. 08/106,258, wherein two horizontally offset versions of a 2-D image are presented to a viewer with special glasses so as to perceive three dimensionality in the 2-D image.

Although the electronic and optical techniques taught by the above-referenced pending applications are effective in modifying a 2-D image so as to achieve an illusion of three-dimensionality, in both cases, the image is distorted in such a way that it is difficult, if not impossible, for a viewer not wearing special glasses to enjoy observing the image. Additionally, especially in the case of the electronic implementation, the circuitry required to adjust horizontal and vertical dimensions and brightness is quite complex and may be beyond the means of a large class of consumers. Although the optical implementation is passive and therefore less complex, since viewers without glasses are unable to enjoy the 2-D picture as two displaced images, switching means are provided in order to activate and deactivate the optical redirection, thus adding complexity. As such, there yet remains a need for a technique whereby a sense of three-dimensionality or depth may be perceived in a two-dimensional image in a cost-effective manner, whereby one group of viewers may perceive this depth enhancement, if desired, while another group of viewers may view the same image at the same time but without the induced three-dimensionality, if they so desire.

SUMMARY OF THE INVENTION

The present invention provides a simple and cost effective apparatus for imparting a sense of depth to a two-dimensional image, preferably including a light-blocking frame or mask disposed around at least the left and right perimeter of the image. The frame or mask may be on the same plane as the image and may be formed by paint, silkscreen or even electronic blanking as long as the mask is light blocking, preferably opaque. According to the invention, a strip of a first light-filtering material is vertically disposed along the right edge of the image proximate to the left, inner edge of the frame and a strip of a second light-filtering material is vertically disposed along the left edge of the image proximate to the right, inner edge of the frame. A layer of the first light filtering material is disposed between the left eye of a viewer and the framed image having the vertical strips of the first and second light filtering materials, and a layer of the second light filtering material is disposed between the right eye of a viewer and the framed image including the vertical strips, causing the image to appear to recede from the frame, which in turn creates a sense of depth in the image, as though the frame creates a window through which the viewer observes the image when, in fact, the image and frame may be disposed along the same physical plane. The materials disposed between the eyes and the image and frame are preferably supported in eyeglass frames.

In a preferred embodiment, first and second strips of a first light-filtering material are vertically disposed along the right edge of the image and the left outermost edge of the frame, respectively. A first and second strip of a second light-filtering material are vertically disposed along the left edge of the image and the right outermost edge of the frame. A layer of the first light filtering material is disposed between the left eye of a viewer and the image with the first and second strips of the first and second light filtering materials, and a layer of the second light filtering material is disposed between the right eye of a viewer and the image including the vertical strips of the first and second light filtering materials, the combination causing the image to appear to recede from the frame and the frame to appear to come forward relative to the image, further intensifying this sense of depth in the image. Again, the materials disposed between the eyes and the image and frame are preferably supported in eyeglass frames.

The first and second light filtering materials are characterized in that they produce a light cancellation effect when overlaid and simultaneously viewed therethrough. As such, the positions of the first and second light-filtering materials may be swapped and still induce the desired efffect. In the preferred embodiment, the first and second light-filtering materials are polarizing filters having their axis of polarization perpendicular to one another. Other light filtering materials are possible, including complementary colors.

The image may take the form of any two-dimensional image, including a conventional television set, still photograph, motion-picture film projection, slide projection, color separated print, projected television image, whether caused by rear or forward projection, and the images may be in black and white or in color. Moreover, the frame around the image need not be supplied as part of the invention, in the event that a frame is supplied in conjunction with the image, as in the case of a television set or monitor having an existing frame or bezel around the screen. Masks may also be used around the image, for example, shadowmasks which curve or bend the top and bottom edges of a rectangular image may further enhance the sense of depth and clarity.

BRIEF DESCRIPTION OF THE DRAWINGS

FIG. 7 shows a placement of vertical polarizing strips with lines forming a vanishing point;

FIG. 8 illustrates yet another combination of polarizing filters and shadow masks, in this case along the curved surfaces that frame the image.

DETAILED DESCRIPTION OF THE INVENTION

The present invention provides a simple and cost effective means for creating the illusion of depth in a two-dimensional image, regardless of how the two-dimensional image is implemented or displayed. To perceive this three-dimensional depth perception, optical filters are used around the image and between an observer and the image with its associated filters, thus causing the image and the area surrounding the image to appear upon different spatial planes. In the preferred embodiment, the optical filters are polarizing materials with their axes of polarization being used to present different images to each eye as will be described in detail below. Other types of optical filters may alternatively be employed, including complementary color filters, and the like. For the sake of comfort, the filters disposed between the viewer and the image are preferably disposed in eyeglass frames, though they may be in other carriers so long as each eye is treated independently. In conjunction with these optical filters, masking and framing techniques will be described which help to enhance the illusory perception of depth into a 2-D image.

Figure 1A:
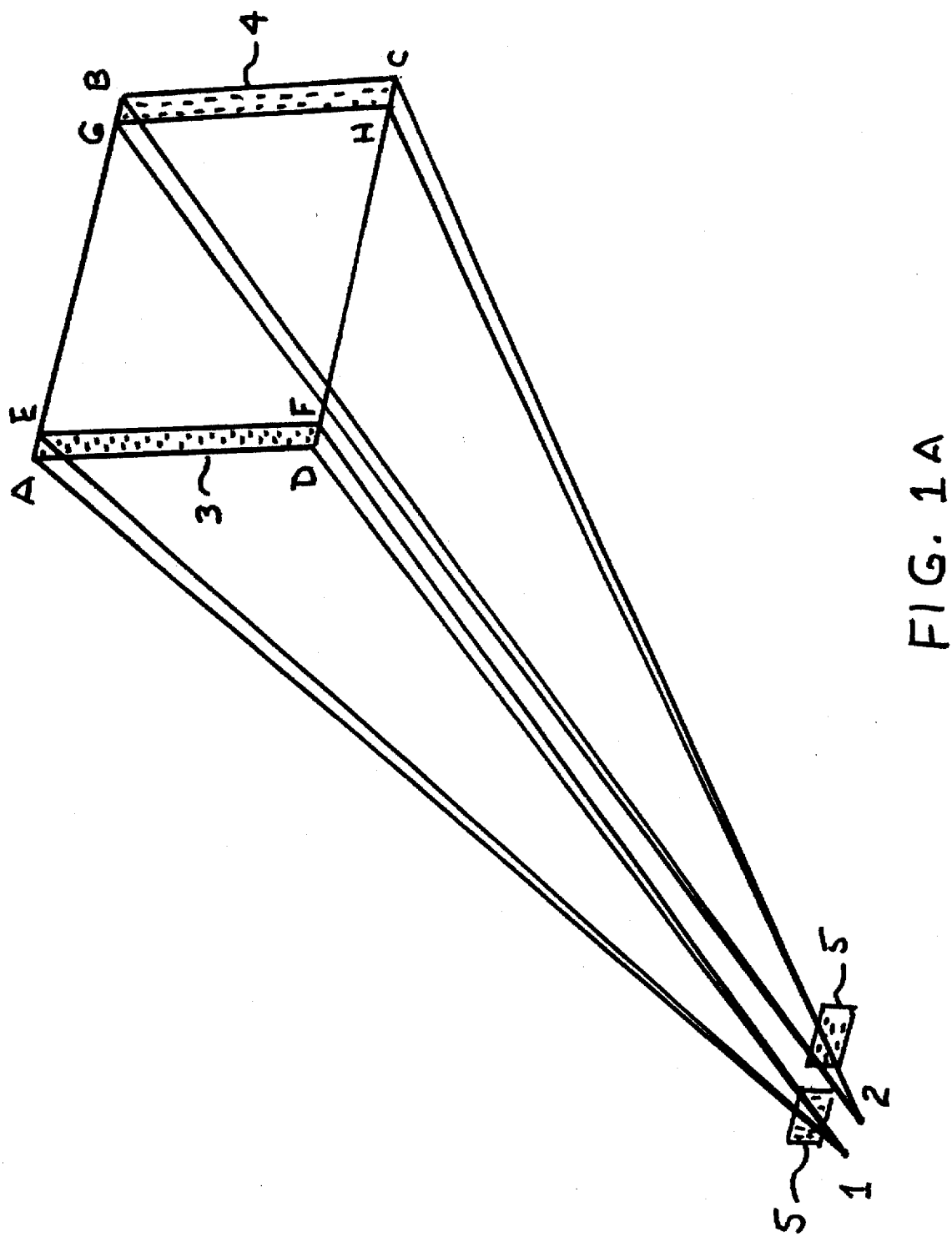
FIG. 1A is an oblique drawing of a prior art masking technique used to create the impression of depth in a two-dimensional image.
Figure 1B:
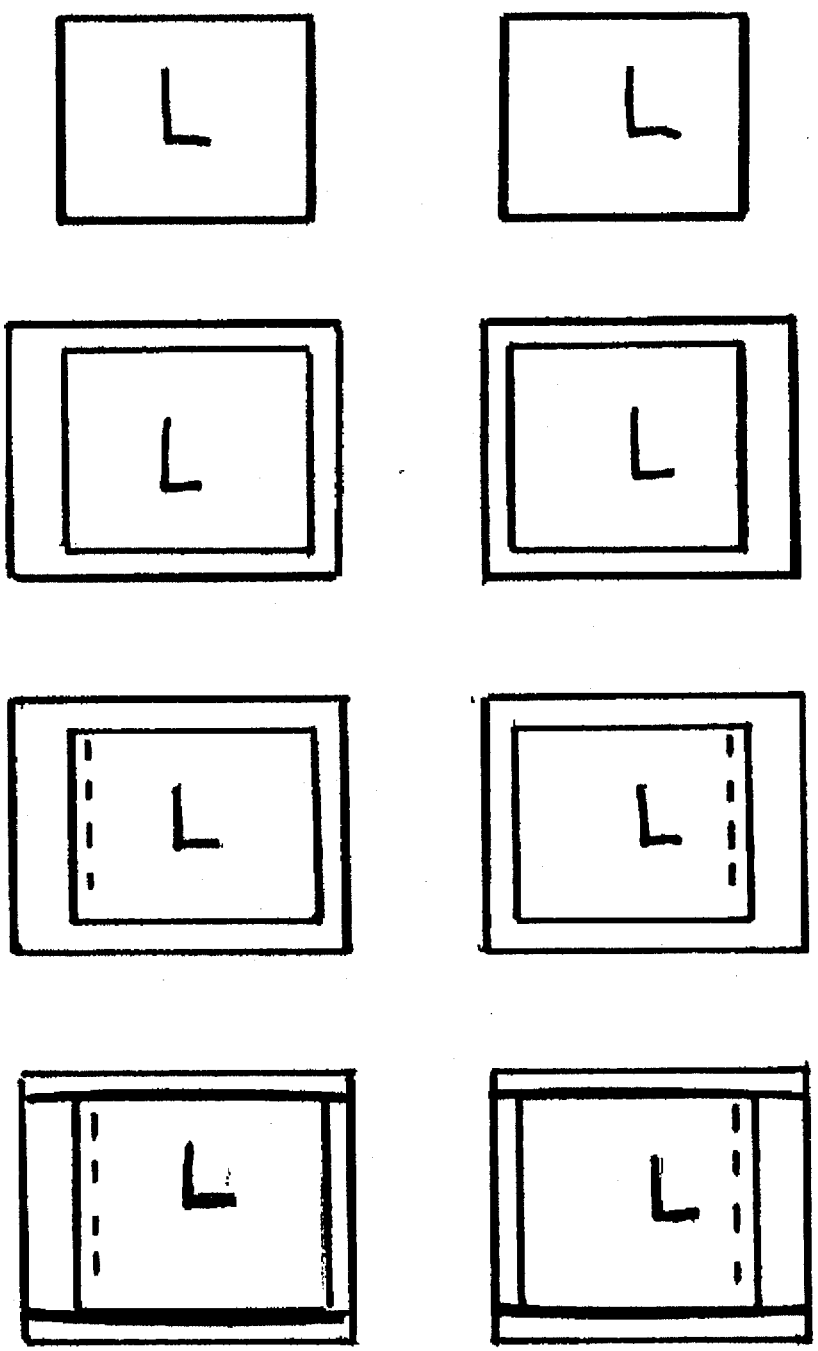
FIG. 1B illustrates the effects using the method of FIG. 1 in conjunction with a frame, wings, and a shadowgraph.

FIG. 1 shows a prior arrangement of polarizing filters described by Favre in U.S. Pat. No. 3,597,042 for viewing pictures in apparent 3-D effect. A plane picture represented by points ABCD is placed in front a viewer having two eyes represented by the points 1 and 2, with 1 being the left eye and 2 being the right eye. The vertical band AEFD on the left side of the picture and the band GBCH of the same size on the right side, are covered with strips of polarizing material 3 and 4 having different axis of polarization. In this figure, for example, strip 3 has a horizontal polarization and strip 4, a vertical polarization. Two similar filters 5 and 6 are placed in front of the eyes of the viewer, for example in the form of eyeglasses. Polarizer 5 has a polarization perpendicular to that of polarizer 3 and polarizer 6 has a polarization perpendicular to that of strip 4. Under these conditions, the left eye 1 does not see the band AEFD of the picture but may view the band GBCH. Additionally, the right eye 2 is able to see the band AEFD but the band represented by GBCH is effectively blocked due to the cross polarizations. This selective masking taught by Fayre has the effect of giving the viewer the impression that he is in front of a picture in relief of a subject situated to the rear of the plane of the initial picture.

It has been found, however, that the Favre technique produces only a mild sensation of depth, and is limited to a particular class of applications due to lighting requirements; and other considerations. Broadly speaking, the limitations of the Favre technique result from the fact that no framing is used around the image, so that the polarizing strips are seen as opaque or black areas on only one vertical edge of the image relative to each eye, and do not exist on both sides of the image presented to each eye. The effects of Favre may be dramatically improved with the addition of frames and/or masks described below, which cause the frame or border around the image to appear to come forward, thus resulting in a marked improvement of the frame effect and the apparent perception of depth in the two-dimensional image. In addition, the use of such frames or masks afford the use of an additional set of optical filters on the right and left outside edges of the frame, causing the image to appear to recede still further from its plane in 3-D space.

Figure 2:
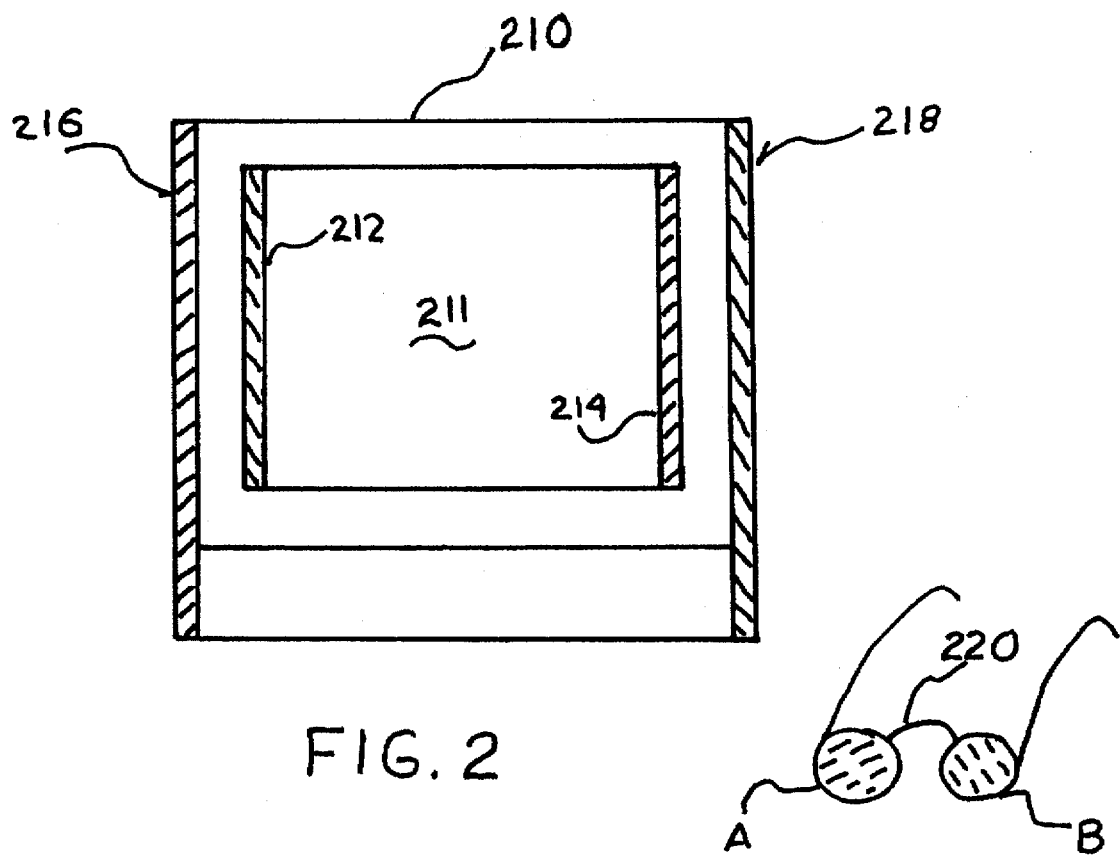
FIG. 2 illustrates the improvement of the present invention, wherein a frame is used around the two-dimensional image and optical filters are also vertically disposed along the right and left outermost edges of the frame.

Now making referencing to FIG. 2, there is shown a television set generally at 210 having narrow strips of polarizing material 212 and 214 mounted along the left and right vertical edges of the television image. Although the following discussion uses a video picture as an example, it is to be understood that the technique and scope of the present invention is not limited to the type of two-dimensional image produced, and is equally applicable to front and rearly projected images, still photographs, motion-picture films, flat-panel displays (such as liquid-crystal screens), high-definition TV displays, transparencies, printed images, and so forth.

A pair of viewing glasses 220 is used to view an image 211 on monitor 210, the axis of polarization of the two lenses of glasses 220 being at right angles to each other, as depicted by dash lines A and B, these polarization orientations being matched to those of strips 212 and 214 in FIG. 1. It should also be understood that the angles of polarization need not be diagonal, but may be vertical, horizontal or at any angle, so long as the area of the image along the right of the image is obscured by filter 214 relative to the right eye, leaving the area of the image covered by filter 212 to be viewable, and with the opposite situation being presented to the left eye.

The improvements of the present invention include a frame or mask which may be used in conjunction with two additional strips of polarizing material 216 and 218. These two additional strips are placed along the outside vertical edges of the television set, or frame such that the polarizing strips are extending sideways outward into space. These two outmost polarizing strips 216 and 218 form "wings" which may protrude outwardly from the front corner of TV set. These outward protrusions serve at least three purposes:

1. The strips 216 and 218 can be back lighted to assure a complete transition from transparent to opaque.
2. The strips 216 and 218 are oriented to be oppositely polarized to the neighbor TV picture edge polarizing strip to which each outboard strip is adjacent.
3. The combination of 1 and 2 above creates a change in the perspective of the vertical frame of the TV picture, causing the frame to project forward from the plane of the TV picture, thereby forming a virtual frame in space.

Figure 3A:
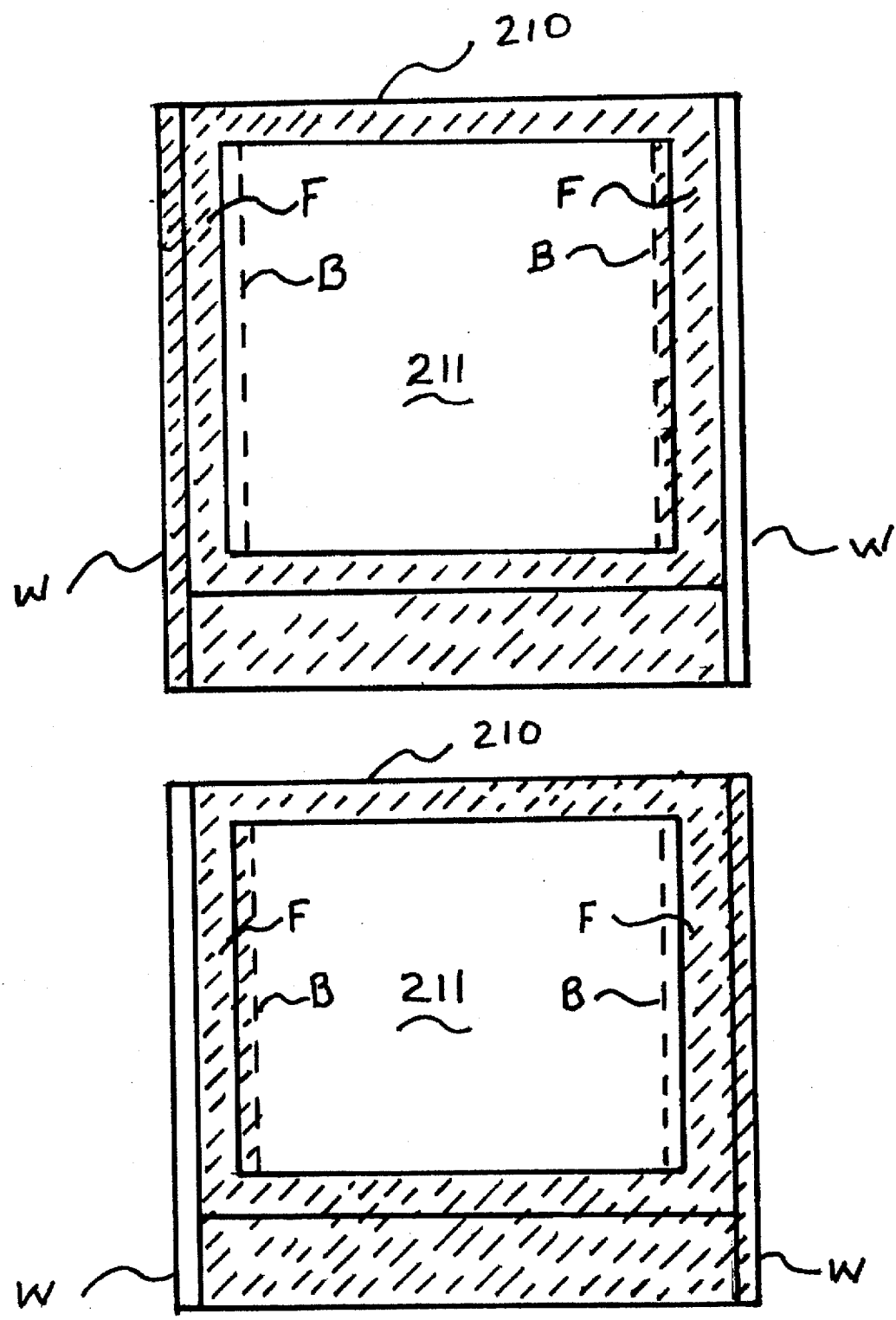
FIG. 3A is a drawing of the TV monitor in FIG. 2 with dimensions to explain the effect of the present invention.

FIG. 3A shows the left and right eye perspective differences which are presented to each eye. The observer's brain interprets two "views" as if the orientation "W" and "F" in the right eye and the corresponding orientation "B" and "F" in the left eye defines an object lying on a plane which exists between the plane of observation and the TV image plane. Simultaneously, the orientation "B" and "F" in the right and the corresponding "W" and "F" in the left eye form an object lying at a plane which exists between the plane of observation and the TV image plane. If the width ("W" on the left is not equal to the width ("W") on the right the image plane will not be perpendicular to the plane of the face of the TV set. If the left edge ("B") and the right edge ("B") polarizing strips are of unequal size, the TV image plane will lie at a plane which is not equal to the plane defined by the real or projected face of the TV set. Naturally, as the observer moves about relative to the TV set the plane upon which the frame is projected will also move.

The present invention is not limited to video or television set applications, and may, in fact be used with all types of projection systems, including forward and rearward projection systems associated with single and multiple lens video systems, as well as with film-type projection systems.

Figure 3B:
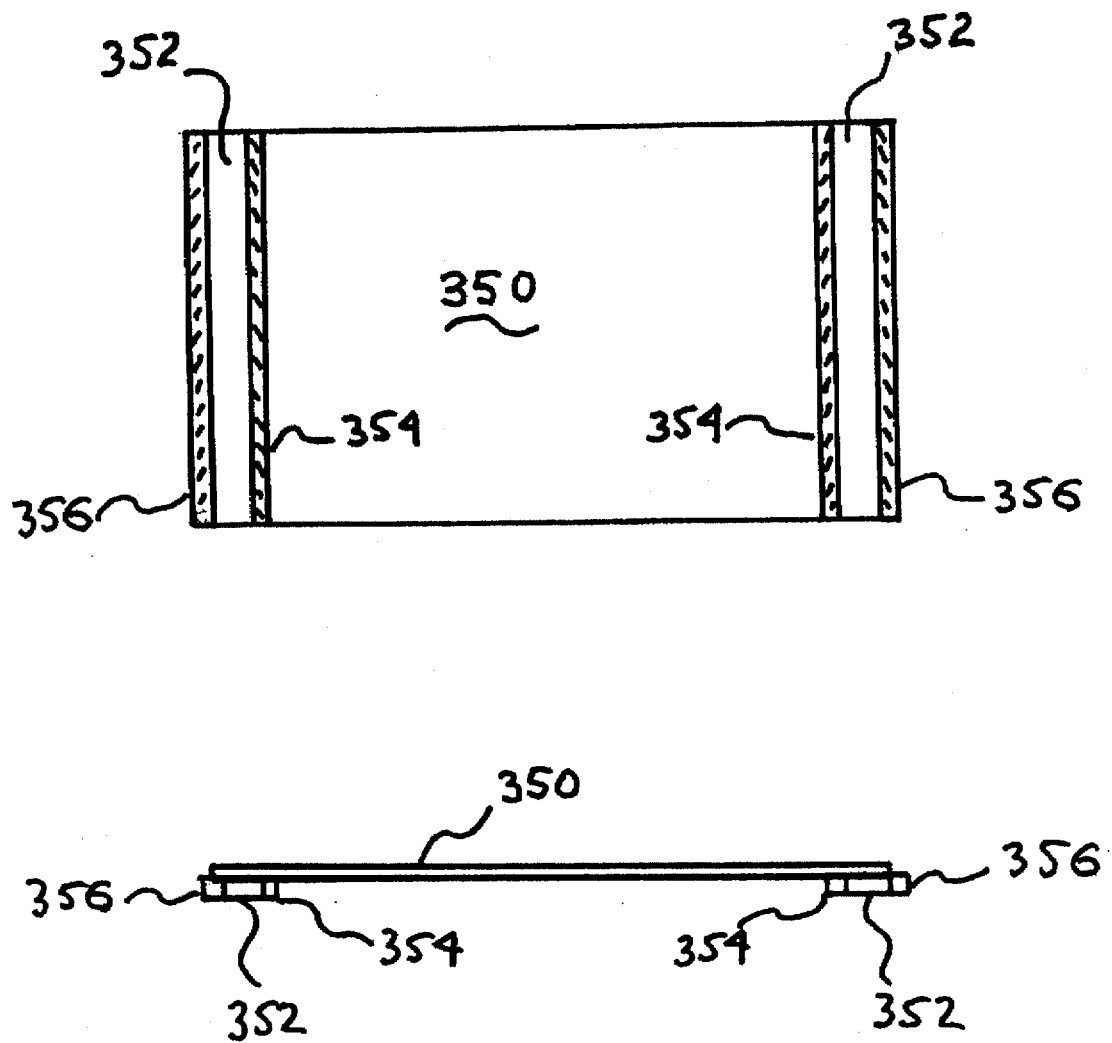
FIG. 3B is a drawing which shows how a projection screen may be modified to accommodate the present invention.
Figure 4:
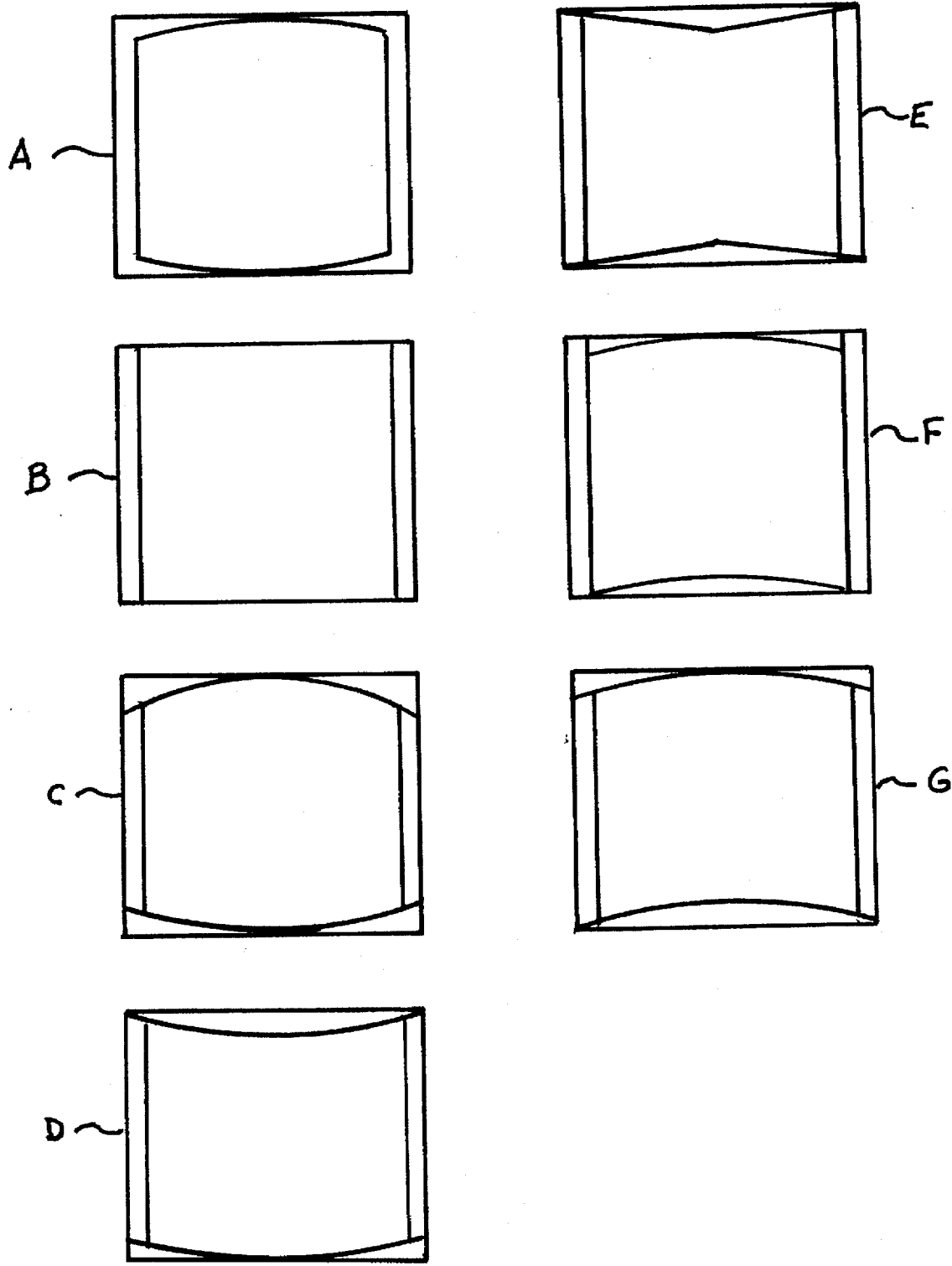
FIGS. 4A–4G illustrate shadow mask options which may be used to enhance the illusion of depth with or without the masks and filters illustrated in FIGS. 1 and 2.

FIG. 3B shows how a conventional screen 350 may be outfitted with frame sections 352 bordering at least the right and left edges of frame 350 along with strips 354 and wings 356 disposed vertically along each frame section 352. In this figure, as in FIG. 2, the diagonal hash markings are used to indicate the angle of polarization such that when glasses 220 shown in FIG. 2 are worn by an observer and a rearward or forward projected image is shown on screen 350, the depth enhancement effect of the present invention is created.

This depth enhancement process is most effective when the front face of the TV set appears as a dark shape or as a silhouette with the wings being clearly illuminated from front or rear. Back-lighting, if used, can be as simple as placing the TV set in front of a wall which is in sharp contrast to the TV set. White or light colored walls will work well under lighting conditions normally encountered while viewing television. The TV set can be fitted with soft back lights which provide lighting contrast or simple reflecting surfaces can be used which are mounted upon or behind the TV set. Mirrors can also be used behind the wings when back lighting is not convenient or possible.

The light colored reference, whether back lighted or directly illuminated, has an impact upon the location of the plane of the frame in space. As the light colored reference is brought closer to the polarizing wing the plane of the frame is moved in space. This interplay between the polarizing wing and the light colored reference creates yet another illusion. Varying the brightness of one image relative to the other can be another contributing factor to the sensation of depth. This can be done quite simply by using filters of unequal densities in the viewing glasses.

The use of polarized viewing glasses which contain non-equal polarizing lenses must be balanced against the illumination scheme used for lighting of wings 216 and 218, as a lack of attention to this matching may sacrifice the degree of depth imparted to the scene. Additionally, the ratio of TV picture edge polarizing strip width to the width of the wing will impact the degree of depth imparted to the scene. The distance between the wings and the light colored reference also influences the degree of depth which is imparted to the scene. The interaction of all of the above factors must be carefully balanced to maximize the amount of depth created by this depth enhancement process while assuring eye comfort.

Further depth enhancement effects can be created which will be observed as being additive or supportive to the original sense of depth created by the polarization technique. Adding a mask or "shadowgraph" to the configuration shown in FIGS. 2 and 3A and 3B creates a dramatic effect. The shadowgraph may consist of a variety of shapes but the one shown in FIGS. 4A appears to be quite comfortable and efficient for television sets. FIGS. 4B–4G depict mask alternatives. As with the frame, the shadowgraph may be used with or without the "wings".

In its simplest form, the shadowgraph can be applied as a black painted or silk-screened mask directly upon the outside face plate of the TV picture tube or upon the inside of the screen of a rear projection TV set. For front projection TV systems the TV tube screens can be pre-formed or masked as above. Alternatively, a physically thin opaque mask can be added to the TV picture tube bezel, fitted between picture tube and bezel (flange) mount, or attached to the front surface of the TV set itself so that it can be easily removed. The same can be applied to projection TV systems so that the mask can be removed if desired. The shadowgraph in its most unobtrusive form, would be created electronically by "blanking out" the desired shape upon the TV picture. This would allow the shadowgraph to be remotely controlled, if desired.

The purpose of the mask is to provide a geometrical shadowgraph which is additive to the polarizing process. At the same time the mask must not impose a restriction upon viewing angle as occurs in "window" type systems (reference U.S. Pat. Nos. 3,582,961 and 2,408,050; see FIG. 5). The most efficient method is therefore the electronic shadowgraph as this would lie upon the inside of the face plate of the TV tube. All other methods are equally efficient, however, because they would be located immediately upon the outside surface of the faceplate of the TV tube and be practically of no relevant thickness.

Figure 5:
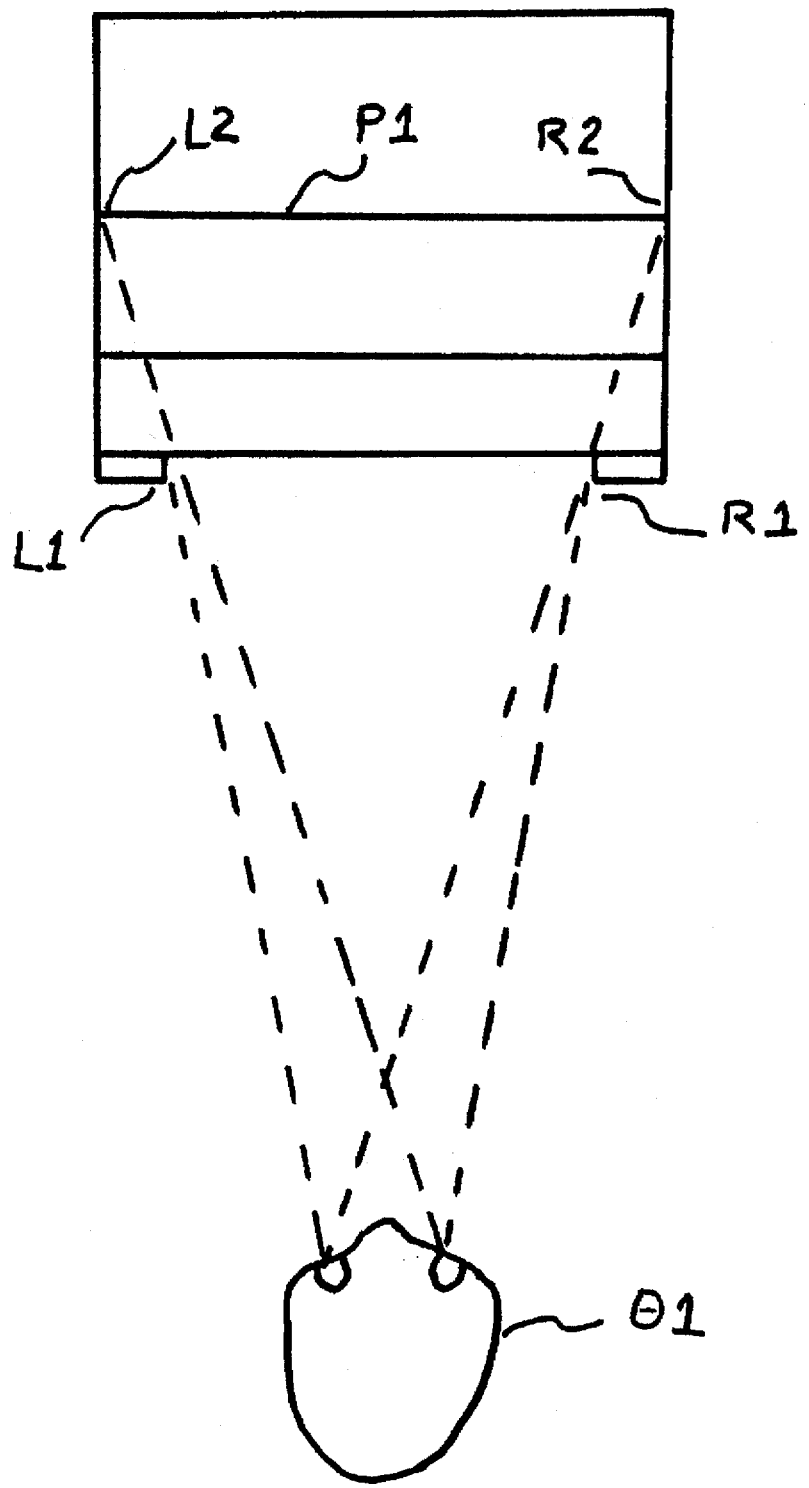
FIG. 5 is a top-view drawing which illustrates a virtual window effect.

FIG. 5 shows a physical window placed between the image plane and the observer. The function of the window is to reduce the extent of the image's visibility to either eye of the observer. Note that the left eye cannot see point $L_2$ because it is obscured by surface $L_1$ while the right eye has an unrestricted view of point $L_2$. Meanwhile the right eye cannot see point $R_2$ because it is obscured by surface $R_1$ while the left eye has an unrestricted view of point $R_2$.

This "window effect" imparts an illusion of depth as a result of the window's limitation upon the observer's ability to see the edges of the image due to the observer's peripheral vision.

Physical windows have major disadvantages in that the field of view may be limited by the window itself. The field of view may be too narrow to be used in viewing situations involving numerous observers. Also, the window itself becomes a physical object which exists in front of the image thereby protruding into space.

Figure 6:
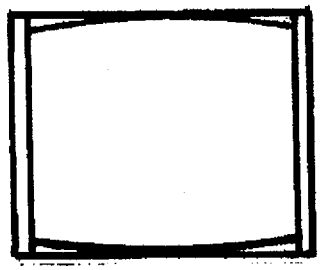
FIG. 6 illustrates an effect created through the use of shadowgraphs.
Figure 6:
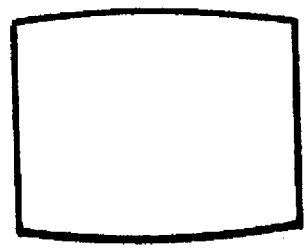
Figure 6:
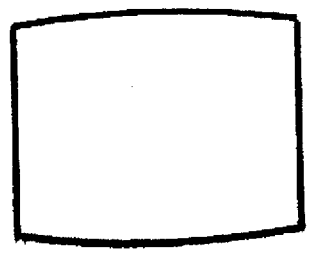

FIG. 6 shows the effect created by the shadowgraph technique. The left and right eye views are exactly, or almost exactly, equal and opposite. The geometry of the mask, however, in conjunction with the polarized strips causes the borders of the image to appear to exist in front of the plane of the 2-D image while the depth-enhanced image appears to be placed behind the plane of the 2-D image. These two illusions are perceived to be summed, thereby increasing the apparent depth which has been imparted to the scene.

The edges of the image appear to hover in front of the set due to the angle which exists at the four corners of the TV picture. The mind interprets the slope of the borders in conjunction with the foreshortened width of the picture as an indication that the borders of the scene are angled toward a vanishing point and toward the viewer. The vision system therefore concludes that the borders lie upon a different plane than the scene. The impression which is formed in the mind of the observer is that the TV screen and the frame around the TV screen are three-dimensional.

Other depth enhancing techniques can be applied as long as care is taken to assure that the techniques sum rather than cancel. Lines can be added to the front surface of the TV bezel which are angled off toward a distant vanishing point. These support lines can help strengthen the impression that the bezel is tapering outward toward the viewer. An example of this is shown in FIG. 7.

Another method to impart further enhanced depth is to add polarizing strips to the edges of the shadowgraph at the sloped surfaces that frame the image. The top surfaces, for example, can be transparent to the left eye while the bottom surfaces can be transparent to the right eye. This is shown in FIG. 8. Similar strips can also be applied to the top and bottom of the frame if desired.

Figure 9:
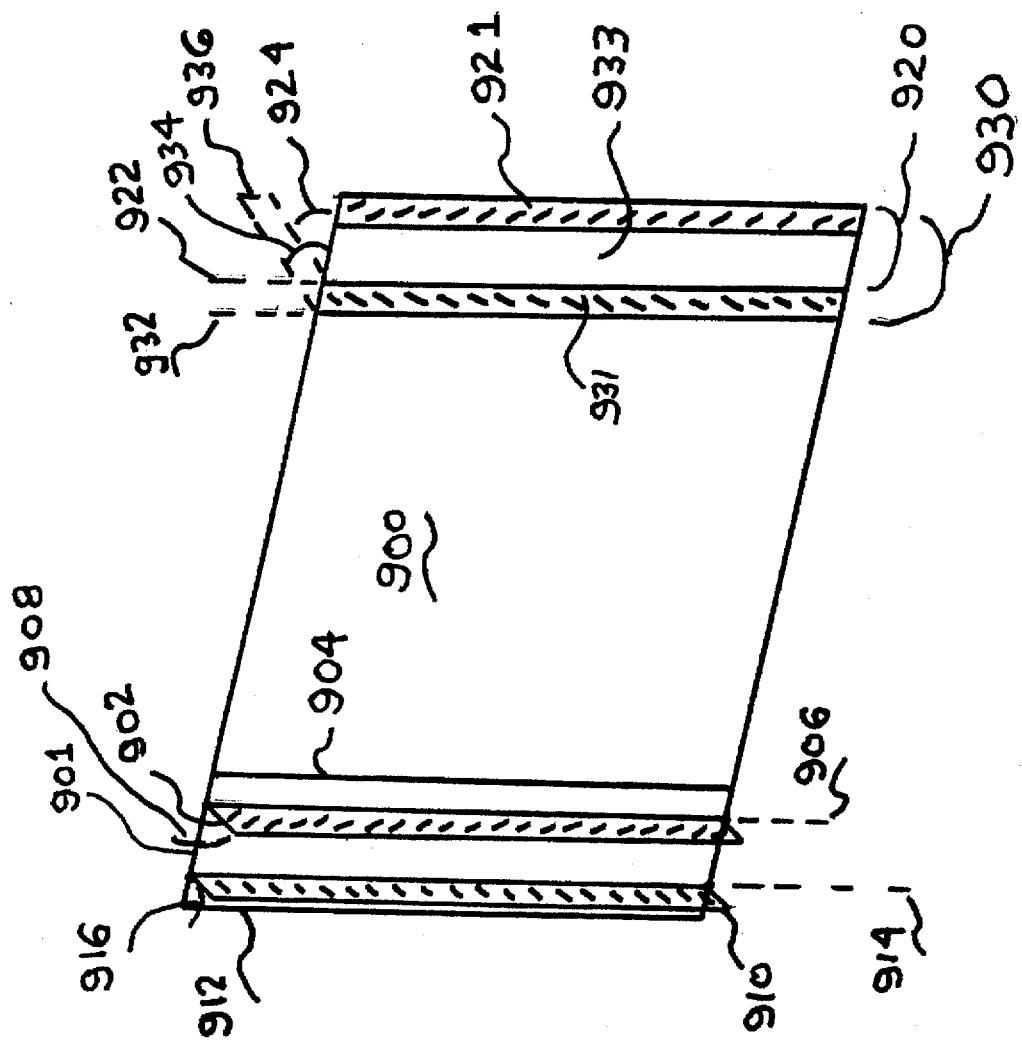
FIG. 9 is a drawing to show how the light-filtering materials of the present invention may be selectively switched into and out of the path between an observer and an image using the light-filtering materials.

In FIG. 9 there is shown a screen 900, which may be any type of display screen including flat-panel and forward or rear projection-type screens. Adjacent the left edge of screen 900 is a frame or mask 901 and to the right of it, a wing 902, and to the left of this frame 901 is a wing member 910, these strips 902 and 910 being the type previously described herein, with an accompanying set of such materials being disposed along the right edge of screen 900. Although one advantage to the present invention is that one observer with appropriate glasses may view a 2-D image and apparent 3-D effect while another, without such glasses, may view a substantially normal version of the same 2-D picture, it may be advantageous to have the strips and wings of the present invention, or the frame which they border, be selectively insertable and removable from the field of view. FIG. 9 shows one mechanism, this being a mechanical mechanism with variations, though other systems, such as electronically polarizable members, may also be possible. It should also be noted that such systems, whether mechanical or electronic, may be manually switchable or, alternatively, operative via remote control.

Referring back to frame 901 with members 902 and 910, during viewing with enhanced depth using glasses, strip 902 would actually be in position shown by broken lines 904, and wing 910 being in that position shown by broken lines 912. However, with suitable mechanical switching means strip 902 may be swung forwardly along axis 906 as shown by arrow 908, thus effectively removing it from an observer's field of view. Likewise, wing member 910 may be rotated about axis 914 as shown by arrow 916 thus also being removed from an observer's field of view.

There are many alternatives possible with such means for selectively removing these light filtering materials. For example, as shown toward the right edge of screen 900 in FIG. 9, an entire section 920 including an outer rightmost wing 921 may be rotated backwardly about axis 922 as indicated by arrow 924, such that particularly for angles of 90 and greater, this entire section will be obscured from view or even hidden behind screen 900. Alternatively, depending upon the circumstances, the entire section 930 including strip 931 and wing 921 and the framing area 933 between them, may be swung backwardly about axis 932 as shown by arrow 934, resulting in the section depicted by broken lines 936. Again, this entire section may be rotated greater than 90°, thus obscuring all of these components behind screen 900.

Having thus described my invention, I claim:

1. A system for imparting a sense of depth to a two-dimensional image having right and left edges, comprising:
   a frame disposed around the perimeter of said image including at least the right and left edges thereof;
   a strip of a first light-filtering material vertically disposed along the right edge of said image adjacent the inner left edge of said frame;
   a strip of a second light-filtering material vertically disposed along the left edge of said image adjacent the inner right edge of said frame;
   a second strip of said first light-filtering material vertically disposed along the left outermost edge of said frame;
   a second strip of said second light-filtering material vertically disposed along the right outermost edge of said frame;
   a layer of said first light-filtering material disposed between the left eye of a viewer and said framed image and said strips of said light-filtering materials; and
   a layer of said second light-filtering material disposed between the right eye of a viewer and said framed image and said strips of said light-filtering materials,
   said first and said second light-filtering materials being characterized in that they produce a light-cancellation effect when overlaid and viewed therethrough,
   wherein said strips disposed adjacent said inner edges of said frame create the illusion that said image appears to recede relative to said frame, and
   said material strips disposed along said outermost edges of said frame create the illusion that said frame appears to come forward relative to said outerward strips.

2. The system of claim 1 wherein said layers of said first and said second light-filtering materials are supported by an eyeglass frame.

3. The system of claim 1 wherein said first and said second light-filtering materials are polarizing filters having their axes of polarization oriented at right angles to one another.

4. The system of claim 1 wherein said image is a television image.

5. The system of claim 4 wherein said television image is derived from a television monitor having a supplied bezel, said frame comprising at least a portion of said bezel.

6. The system of claim 1 wherein said television image is a projected television image.

7. The system of claim 6 wherein said television image is derived from a single-lens projection system.

8. The system of claim 6 wherein said television image is derived from a multi-color projection system.

9. The system of claim 6 wherein said television image is a rear-projection television image.

10. The system of claim 6 wherein said television image is a front-projection television.

11. The system of claim 1 wherein said image is a motion-picture image.

12. The system of claim 1 wherein said image is a photographic image.

13. The system of claim 1 wherein said frame is superimposed upon a portion of the image.

14. The system of claim 1 including switching means whereby said strips of said light-filtering materials may be selectively inserted and removed from the path between said viewer and said image.

15. The system of claim 1, further including a source of illumination disposed behind said strips of said light-filtering material vertically disposed along said left and said right outermost edges of said image and said frame.

16. The system of claim 15 wherein at least a portion of the illumination is provided by the image.

17. The system of claim 15 wherein at least a portion of the illumination is provided by mirrors disposed behind said outermost strips relative to an observer.

18. Apparatus for imparting a sense of depth to a two-dimensional image, comprising:
   an opaque frame disposed within a plane around at least a portion of the perimeter of said image;
   a first strip of a first light-filtering material vertically disposed along the right edge of said image;
   a second strip of said first light-filtering material vertically disposed along the left outermost edge of said frame;
   a first strip of a second light-filtering material vertically disposed along the left edge of said image;
   a second strip of said second light-filtering material vertically disposed along the right outermost edge of said frame;
   a layer of said first light-filtering material disposed between the left eye of a viewer and said image with said first and said second strips of said first and said second light-filtering materials; and
   a layer of said second light-filtering material disposed between the right eye of a viewer and said image with said first and said second strips of said first and said second light-filtering materials;
   said first and said second light-filtering materials being characterized in that they produce a light-cancellation effect when overlaid and viewed therethrough,
   said material strips disposed along said outermost edges of said frame creating the illusion that said frame appears to come forward relative to said outermost strips.

19. The apparatus of claim 18, wherein said two-dimensional image is a television image derived from a monitor having a supplied bezel, and wherein said frame comprises at least a portion of said bezel.

20. The apparatus of claim 18, wherein said opaque frame is a removable item to which all of said strips are attached.

* * * * *